March 18, 1941.  A. CRAMWINCKEL  2,235,203
ULTRA SHORT WAVE RECEIVING SET
Filed May 28, 1938

INVENTOR.
ARNAUD CRAMWINCKEL
BY
ATTORNEY.

Patented Mar. 18, 1941

2,235,203

UNITED STATES PATENT OFFICE 2,235,203

ULTRA SHORT WAVE RECEIVING SETS

Arnaud Cramwinckel, Eindhoven, Netherlands, assignor, by mesne assignments, to Radio Corporation of America, New York, N. Y., a corporation of Delaware Application May 28, 1938, Serial No. 210,606
In Germany July 5, 1937

3 Claims. (Cl. 250—20)

This invention has reference to an ultra-short radio wave receiving set arranged for the reception of a predetermined comparatively narrow frequency spectrum and comprising a receiving circuit with attendant doublet antenna. The expression "comparatively narrow frequency spectrum" is to be understood to mean a spectrum the width of which is small relative to the frequencies comprised within the spectrum. The invention relates, therefore, primarily to a fixedly tuned receiving set, which is only suitable for the reception of a single predetermined carrier wave with attendant side bands, or for the reception of the picture carrier wave and the sound carrier wave of a single television transmitter. It may, however, be used also with a receiving set which can be tuned over a comparatively narrow frequency spectrum and which is suitable, for example, for the reception of two television transmitters whose picture carrier waves have a difference in frequency which is small in relation to their frequencies.

The invention has for its object to provide means for obtaining with a given field intensity of the oscillations impinging on the antenna the highest possible voltage at the control grid of the first tube of the receiving circuit.

In order that the invention may be clearly understood and readily carried into effect, it will now be described more fully with reference to the accompanying drawing, wherein.

Figure 3:
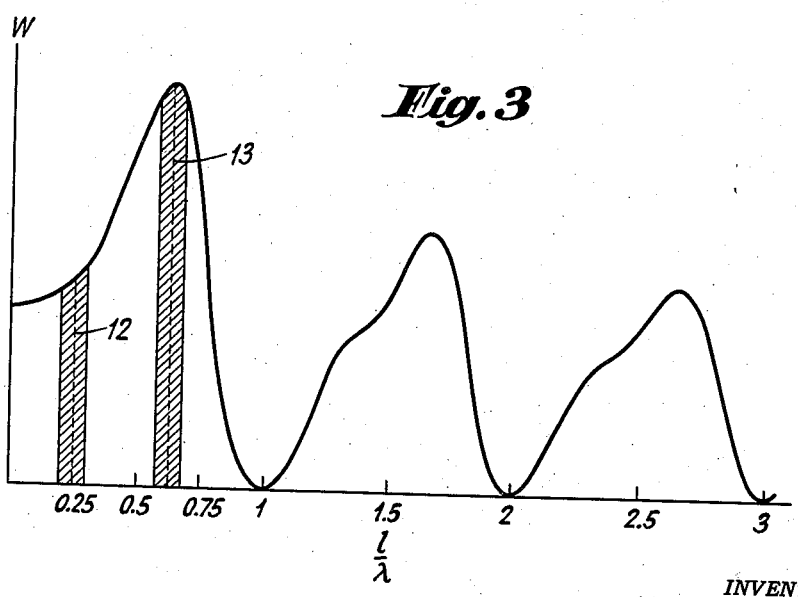

Fig. 3 graphically illustrates the relative intensities of input energies available both for a circuit designed in accordance with the invention and for a circuit according to known practice.

Figure 1:
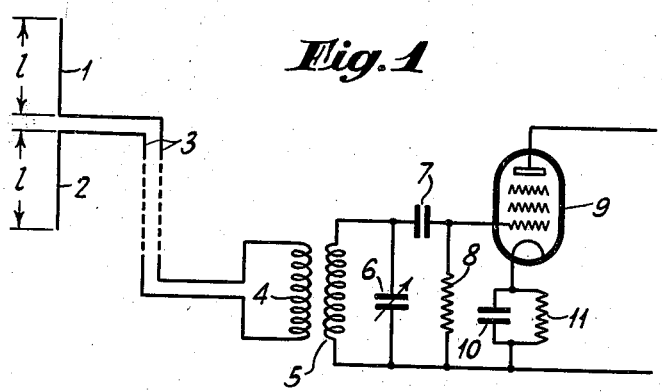
Fig. 1 shows the parts of a receiving set of the above-mentioned kind which are necessary for an understanding of the invention.

Referring to Fig. 1 in more detail, the dipole or doublet antenna comprises two radiators 1 and 2, each of which has an electric length $l$. The high frequency signal oscillations in the antenna are supplied via a double lead 3 to the input coil 4 of the receiving circuit which is coupled inductively to the inductance coil 5 of the input circuit. A tuning condenser 6 is connected in parallel with the coil 5 and permits the receiving set to be tuned in some cases over a comparatively narrow frequency spectrum. The voltage occurring in the circuit 5, 6 is supplied via a grid condenser 7 and a leak 8 to the control grid of the first valve 9, e. g., a high frequency amplifier 5. The cathode lead of the valve includes in the ordinary manner a resistance 11 and a condenser 10 for setting up a negative grid bias.

Figure 2:
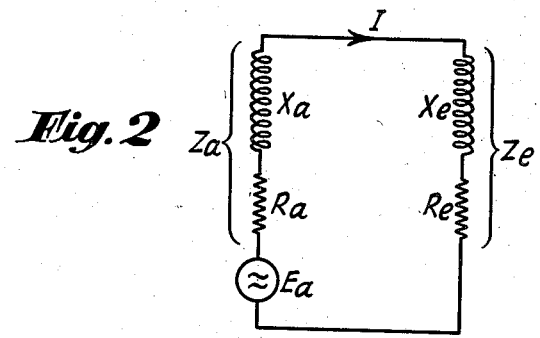
Fig. 2 shows the equivalent circuit diagram for the system of Fig. 1.

Fig. 2 shows the substitution diagram of the circuit shown in Fig. 1, the antenna being represented by an oscillator having an electromotive force $E_a$ and an internal impedance $Z_a = R_a + jX_a$, the receiving circuit by its input impedance $Z_e = R_e + jX_e$. The antenna resistance $R_a$ is constituted essentially by the radiating resistance which is heavy as compared with the ohmic resistance. As is well known, the impedance $Z_e$ has supplied to it a maximum energy when $R_a = R_e$ and $X_a + X_e = 0$, that is to say, the energy supplied to the input circuit of the receiving circuit arrangement has reached its maximum value when the input resistance $R_e$ of the receiving circuit equals the radiating resistance $R_a$ of the antenna, and the input reactance $X_e$ is opposed to the antenna reactance $X_a$. In this case, the input circuit of the receiving circuit arrangement is matched to the antenna.

In the receiving circuit arrangements of the above-mentioned kind hitherto used, the condition $X_a + X_e = 0$ has always been satisfied by making the antenna reactance $X_a$ and also the input reactance $X_e$ zero for a frequency comprised within the frequency spectrum to be received, that is to say, both the antenna and the input circuit (5, 6, Fig. 1) have been tuned to the said frequency, the desired tuning of the antenna being obtained in any case by choosing the electric length of each of the radiators of the dipole or doublet antenna so as to be equal to one-quarter of the wavelength corresponding to the tuning frequency.

According to the invention, a substantially higher voltage at the control grid of the first valve is obtained with constant field intensity of the oscillations impinging on the antenna by choosing the electric length of each of the aerials of the doublet antenna so as to be about five-eighths of the wavelength that corresponds to a frequency comprised within the frequency spectrum to be received, the above-mentioned matching of the input circuit to the antenna being maintained, that is to say with the said frequency the input resistance of the receiving circuit is chosen so as to be equal to the radiating resistance of the antenna and the input reactance so as to be opposed to the antenna reactance. The invention consists, therefore, in that the antenna is tuned to a frequency which is about 2.5 times lower than with the receiving sets hitherto used and the input circuit of the receiving circuit arrangement is tuned to a correspondingly higher frequency in such manner that the entire receiving set is tuned to a frequency comprised within the frequency spectrum to be received.

The fact that owing to the invention a substantially higher voltage is received at the grid of the first valve than in the well known devices, may be explained as follows: The voltage at the grid of the first valve has reached its maximum value when the energy supplied to the input circuit has reached its maximum value. According to the substitution diagram of Fig. 2, this energy is $W=J^2 R_e$. Now, if the above-mentioned matching conditions are satisfied, $$J = \frac{E_a}{R_a + R_e} = \frac{E_a}{2R_a}$$

so that $$W = \frac{E_a^2}{4R_a}$$

If with a constant field intensity, the value $$\frac{E_a^2}{4R_a}$$

is calculated as a function of the length $l$ of the two doublet radiators, we obtain the curve shown in Fig. 3, from which it is directly seen that for $$\frac{l}{\lambda} \cong \frac{5}{8}$$

a sharp maximum value occurs at which the energy $W$ is about twice as large as for the usual value $$\frac{l}{\lambda} = \frac{1}{4}$$

$\lambda$ designating the wavelength of the received oscillations.

The cross-hatched bands 12 and 13 in Fig. 3 show the position of the frequency spectrum to be received in relation to the radiator length $l$ in the receiving sets hitherto used and in the set according to the invention. In the well known devices, the radiator length $l$ was chosen for a frequency comprised within the frequency spectrum to be received and situated preferably in the center of this spectrum so as to be equal to $$\frac{\lambda}{4}$$

which is illustrated by the band 12, whereas according to the invention the radiator length $l$ is chosen, particularly for the average frequency of the spectrum to be received so as to be equal to about $\frac{5}{8}\lambda$, which is represented by the band 13. As will be seen, the choice, according to the invention, of the radiator length results in a substantially higher energy in the input circuit and thus in a substantially higher voltage at the grid of the first valve.

Instead of a doublet antenna comprising two radiators, as shown in Fig. 1, half a doublet, that is to say a single radiator, may be used whose electric length should also be equal to about five-eighths of the wavelength of a frequency comprised within the frequency spectrum to be received. This radiator is then connected to one of the conductors of the double lead 3, whereas the other conductor of this double lead is connected to earth.

What is claimed is:

1. An ultra short radio wave receiving set arranged for the reception of a predetermined comparatively narrow frequency spectrum and comprising a receiving electron discharge device circuit coupled to a doublet antenna having two arms, wherein the electrical length of each of the arms of the doublet antenna is about five-eighths of the wavelength that corresponds to a frequency spectrum and for this frequency the input resistance of the receiving circuit is equal to the radiating resistance of the antenna and the input reactance is opposed to the antenna reactance.

2. An ultra short wave radio receiving set arranged for the reception of a predetermined comparatively narrow frequency spectrum and comprising a receiving electron discharge device circuit coupled to an antenna having at least one arm, the electrical length of said antenna arm being about five-eighths of the wavelength that corresponds to a frequency within the said frequency spectrum and for this frequency the input resistance of the receiving circuit being equal to the radiating resistance of the antenna and the input reactance being equal in value and opposite in sign to the antenna reactance.

3. An ultra short radio wave receiving system arranged for the reception of a predetermined completely comparatively narrow frequency spectrum, comprising an electron discharge device radio frequency amplifier having a control electrode and a cathode electrode, a doublet antenna having a pair of arms each of which has a length approximately equal to five-eighths of the wavelength that corresponds to a frequency within said spectrum, a transmission line coupling said arms to said control and cathode electrodes, the input resistance of said amplifier being equal to the radiation resistance of said antenna, and the input reactance of said amplifier being of opposite sense to the antenna reactance at said frequency.

ARNAUD CRAMWINCKEL.